United States Patent [19]
Bruner

[11] Patent Number: 6,164,181
[45] Date of Patent: Dec. 26, 2000

[54] VEHICLE SEAT BALLISTIC SHIELD

[76] Inventor: John P. Bruner, 2550 Brush Run Rd., Washington, Pa. 15301

[21] Appl. No.: 09/321,157

[22] Filed: May 27, 1999

[51] Int. Cl.[7] .............................. F41H 5/02; F41H 7/00; B64D 7/00; E06B 9/00
[52] U.S. Cl. ...................... 89/36.02; 89/36.07; 89/36.08; 89/36.11; 109/49.5
[58] Field of Search ............................... 89/36.01, 36.02, 89/36.07, 36.08, 36.11; 109/49.5

[56] References Cited

U.S. PATENT DOCUMENTS

| | | | |
|---|---|---|---|
| 4,035,014 | 7/1977 | Sellers | 296/24 R |
| 5,164,536 | 11/1992 | Barbaza et al. | 89/36.11 |
| 5,180,880 | 1/1993 | Zufle | 89/36.02 |
| 5,438,908 | 8/1995 | Madden, Jr. | 89/36.08 |
| 5,448,938 | 9/1995 | Fernandez et al. | 89/36.02 |

*Primary Examiner*—Charles T. Jordan
*Assistant Examiner*—Kyongtaek Kevin Mun

[57] ABSTRACT

A vehicle seat ballistic shield for mounting the backrest of a seat of vehicle to protect user sitting on the seat from rearward originating projectiles. The vehicle seat ballistic shield includes a body shield with front and back faces. The body shield is designed for positioning adjacently behind a backrest and headrest of a seat of a vehicle. A plurality of elongate flexible vertical straps are coupled to the front face of the body shield towards the top edge of the body shield. Each of the vertical straps is designed for looping vertically around the headrest of the seat to attach the body shield to the headrest of the seat.

11 Claims, 2 Drawing Sheets

VEHICLE SEAT BALLISTIC SHIELD

BACKGROUND OF THE INVENTION

1. Field of the Invention

The present invention relates to vehicle seat ballistic shields and more particularly pertains to a new vehicle seat ballistic shield for mounting the backrest of a seat of vehicle to protect user sitting on the seat from rearward originating projectiles.

2. Description of the Prior Art

The use of vehicle seat ballistic shields is known in the prior art. More specifically, vehicle seat ballistic shields heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,487,323; U.S. Pat. No. 5,438,908; U.S. Pat. No. 5,811,719; U.S. Pat. No. Des. 372,216; U.S. Pat. No. 5,271,311; and U.S. Pat. No. 4,173,369.

While these devices fulfill their respective, particular objectives and requirements, the aforementioned patents do not disclose a new vehicle seat ballistic shield. The inventive device includes a body shield with front and back faces. The body shield is designed for positioning adjacently behind a backrest and headrest of a seat of a vehicle. A plurality of elongate flexible vertical straps are coupled to the front face of the body shield towards the top edge of the body shield. Each of the vertical straps is designed for looping vertically around the headrest of the seat to attach the body shield to the headrest of the seat.

In these respects, the vehicle seat ballistic shield according to the present invention substantially departs from the conventional concepts and designs of the prior art, and in so doing provides an apparatus primarily developed for the purpose of mounting the backrest of a seat of vehicle to protect user sitting on the seat from rearward originating projectiles.

SUMMARY OF THE INVENTION

In view of the foregoing disadvantages inherent in the known types of vehicle seat ballistic shields now present in the prior art, the present invention provides a new vehicle seat ballistic shield construction wherein the same can be utilized for mounting the backrest of a seat of vehicle to protect user sitting on the seat from rearward originating projectiles.

The general purpose of the present invention, which will be described subsequently in greater detail, is to provide a new vehicle seat ballistic shield apparatus and method which has many of the advantages of the vehicle seat ballistic shields mentioned heretofore and many novel features that result in a new vehicle seat ballistic shield which is not anticipated, rendered obvious, suggested, or even implied by any of the prior art vehicle seat ballistic shields, either alone or in any combination thereof.

To attain this, the present invention generally comprises a body shield with front and back faces. The body shield is designed for positioning adjacently behind a backrest and headrest of a seat of a vehicle. A plurality of elongate flexible vertical straps are coupled to the front face of the body shield towards the top edge of the body shield. Each of the vertical straps is designed for looping vertically around the headrest of the seat to attach the body shield to the headrest of the seat.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle seat ballistic shield apparatus and method which has many of the advantages of the vehicle seat ballistic shields mentioned heretofore and many novel features that result in a new vehicle seat ballistic shield which is not anticipated, rendered obvious, suggested, or even implied by any of the prior art vehicle seat ballistic shields, either alone or in any combination thereof.

It is another object of the present invention to provide a new vehicle seat ballistic shield which may be easily and efficiently manufactured and marketed.

It is a further object of the present invention to provide a new vehicle seat ballistic shield which is of a durable and reliable construction.

An even further object of the present invention is to provide a new vehicle seat ballistic shield which is susceptible of a low cost of manufacture with regard to both materials and labor, and which accordingly is then susceptible of low prices of sale to the consuming public, thereby making such vehicle seat ballistic shield economically available to the buying public.

Still yet another object of the present invention is to provide a new vehicle seat ballistic shield which provides in the apparatuses and methods of the prior art some of the advantages thereof, while simultaneously overcoming some of the disadvantages normally associated therewith.

Still another object of the present invention is to provide a new vehicle seat ballistic shield for mounting the backrest of a seat of vehicle to protect user sitting on the seat from rearward originating projectiles.

Yet another object of the present invention is to provide a new vehicle seat ballistic shield which includes a body shield with front and back faces. The body shield is designed for positioning adjacently behind a backrest and headrest of a seat of a vehicle. A plurality of elongate flexible vertical straps are coupled to the front face of the body shield towards the top edge of the body shield. Each of the vertical straps is designed for looping vertically around the headrest of the seat to attach the body shield to the headrest of the seat.

Still yet another object of the present invention is to provide a new vehicle seat ballistic shield that protects a user's back and head from being struck by projectiles.

Even still another object of the present invention is to provide a new vehicle seat ballistic shield that is easy to mount to the back of a seat of a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
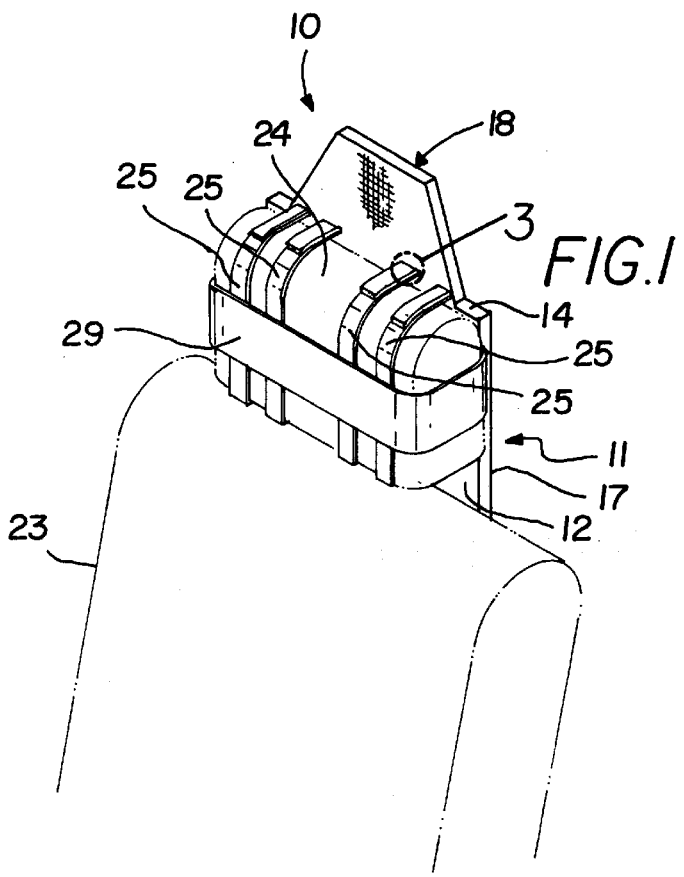
FIG. 1 is a schematic front perspective view of a new vehicle seat ballistic shield attached to the backrest of a seat of a vehicle according to the present invention.
Figure 2:
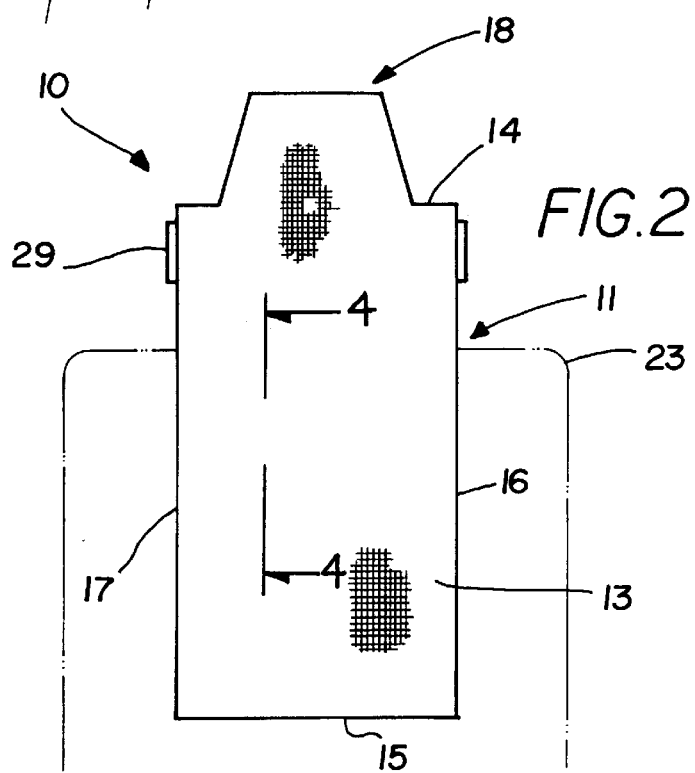
FIG. 2 is a schematic back view of the present invention.
Figure 3:
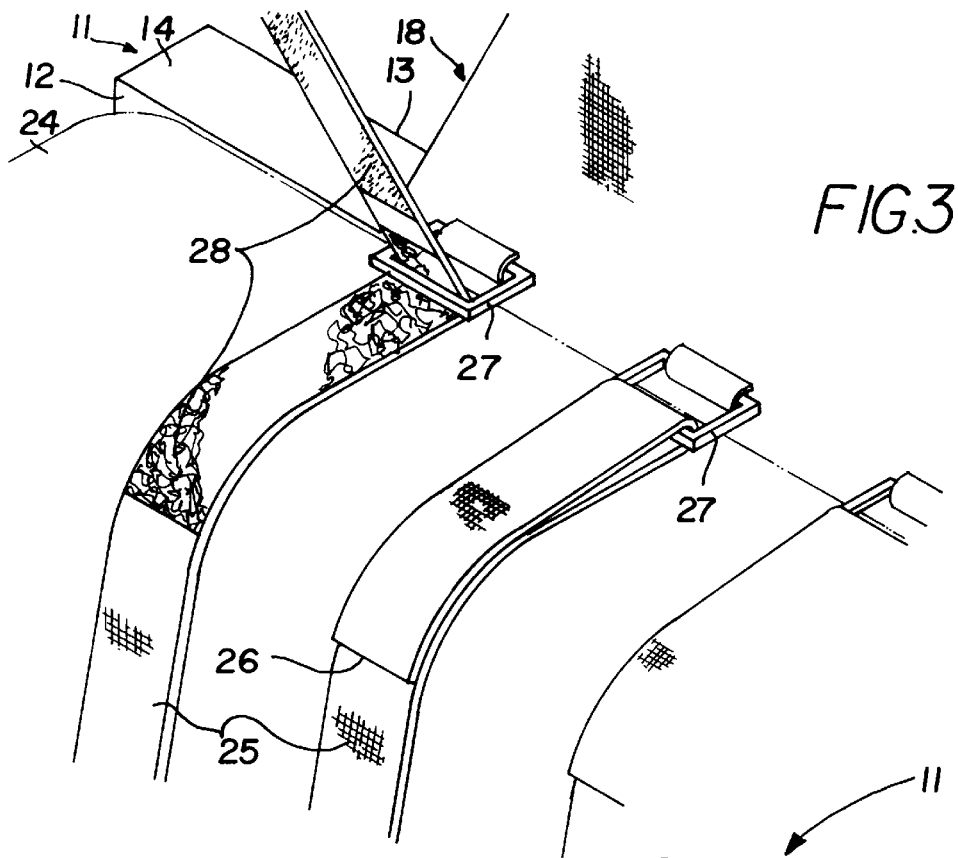
FIG. 3 is a schematic enlarged perspective view illustrating the area around the free ends of the vertical straps taken from the vantage of circle 3 on FIG. 1.
Figure 5:
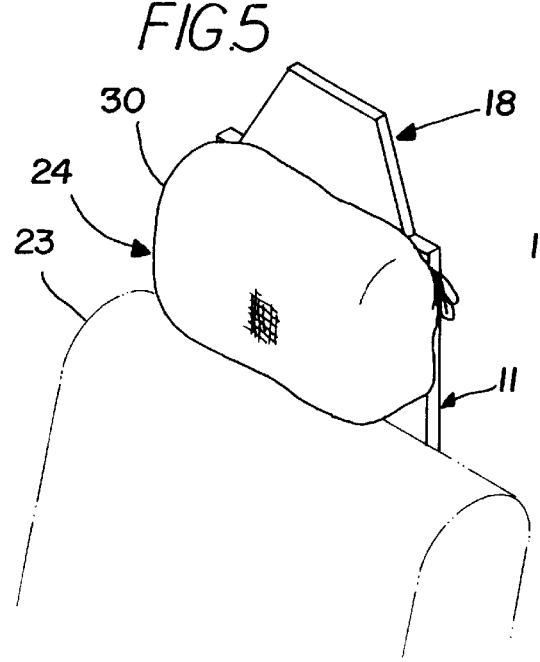
FIG. 5 is a schematic perspective view of the present invention with a protective cover on the headrest covering the straps.
Figure 4:
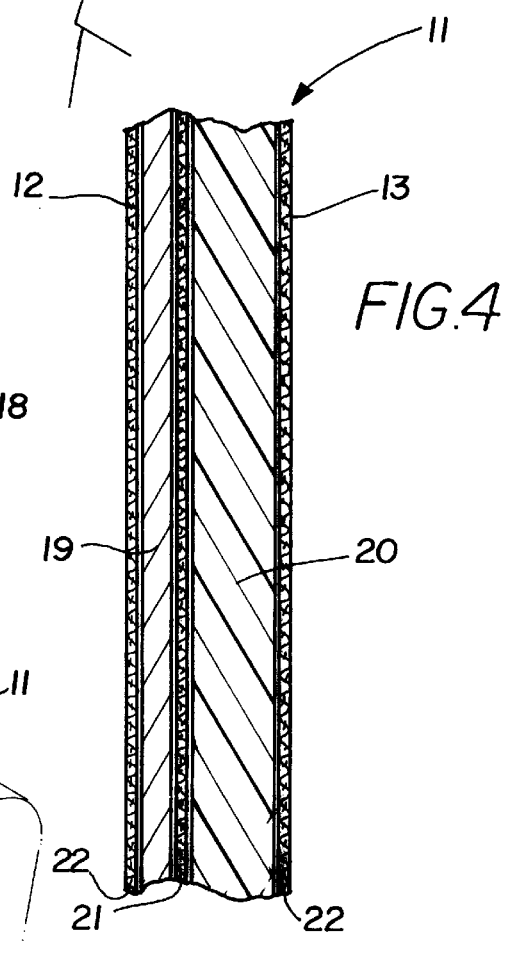
FIG. 4 is a schematic cross sectional view of the present invention taken from line 4—4 of FIG. 2.

With reference now to the drawings, and in particular to FIGS. 1 through 5 thereof, a new vehicle seat ballistic shield embodying the principles and concepts of the present invention and generally designated by the reference numeral 10 will be described.

As best illustrated in FIGS. 1 through 5, the vehicle seat ballistic shield 10 generally comprises a body shield with front and back faces. The body shield is designed for positioning adjacently behind a backrest and headrest of a seat of a vehicle. A plurality of elongate flexible vertical straps are coupled to the front face of the body shield towards the top edge of the body shield. Each of the vertical straps is designed for looping vertically around the headrest of the seat to attach the body shield to the headrest of the seat.

In close detail, the ballistic shield 10 includes a generally rectangular planar body shield 11 having front and back faces 12,13, substantially parallel top and bottom edges 14,15, and a pair of substantially parallel side edges 16,17 extending substantially perpendicular to the top and bottom edges of the body shield. In an ideal illustrative embodiment, the body shield has a length defined between the top and bottom edges of about 14 inches, a width defined between the side edges of about 11 inches and a thickness between about ½ inch and about ¾ inch which are optimal dimensions for sufficiently covering the backrest of the seat and also permitting easy removal and transport of the body shield from the backrest without undue hindrance, especially through a back passenger door of a vehicle.

In a preferred embodiment, a generally trapezoidal planar head shield 18 upwardly extends from the top edge of the body shield and is integrally coupled to the body shield. Ideally, the body and head shields lie in a common plane with one another.

The body and head shields comprise substantially coextensive front and back protective layers 19,20 preferably with a dividing layer 21 interposed therebetween, and an outer layer 22 substantially enclosing the front and back layers and the dividing layer therein. The front protective layer 19 is positioned towards the front face of the body shield and the back protective layer 20 is positioned towards the back face of the body shield.

Preferably, the front protective layer comprises a metal material and the back protective layer comprises an aramid fiber woven material such as the type sold under the name KEVLAR. These materials are both bullet proof materials that can stop bullets and other high-speed projectiles from passing through the ballistic shield. Thus, the front and back protective layers should be made out of materials and have thickness' both sufficient to stop bullets from passing through the body and head shields to thereby protect the user from injury from bullets coming from behind the user. The dividing layer and the outer layer each preferably comprise a fabric material such as a nylon fabric material.

In use, the body shield is designed for positioning adjacently behind a backrest 23 and headrest 24 of a seat of a vehicle to protect the back and neck of the user sitting on the seat. The head shield is designed for positioning above and behind the headrest of the seat of the vehicle to protect the head of the user sitting on the seat.

The body shield has several straps for attaching it to the headrest of the seat. This includes a plurality of elongate flexible vertical straps 25 coupled to the front face of the body shield towards the top edge of the body shield. Each of the vertical straps is designed for looping vertically around the headrest of the seat to attach the body shield to the headrest of the seat. Each of the vertical straps has a free end 26. A plurality of fastening loops 27 are coupled to the front face of the body shield. Each of the fastening loops is associated with a corresponding vertical strap. The free ends of the vertical straps are extended through the respective associated fastening loops to secure the free ends of the vertical straps in place after looping around the headrest. Each of the vertical straps preferably has a hook and loop fastener 28 thereon detachably coupling the free end of the respective vertical strap to an adjacent portion of the respective vertical strap.

Also included is an elongate flexible horizontal strap 29 coupled to the side edges of the body shield adjacent the top edge of the body shield. The horizontal strap is designed for looping horizontally around the headrest of the seat over the vertical straps to attach the body shield to the headrest of the seat. The horizontal strap has a width greater than the width of each vertical strap to help prevent turning, twisting and curling of the horizontal and vertical straps by contact with a user's neck and head during use. In an ideal illustrative embodiment, the width of the horizontal strap is about 4 inches and the width of each vertical strap is about 1½ inches for optimally prevent turning, twisting and curling of the horizontal and vertical straps by contact with a user's neck and head during use.

Ideally, a protective cover 30 is placed on the headrest over the straps to cover the straps and to help ensure that the straps are not twisted, moved or curled during use. This protective cover may have an exterior surface with logos and designs displayed thereon.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A ballistic shield for attachment to a backrest of a seat of a vehicle, said ballistic shield comprising:

a generally rectangular planar body shield having front and back faces, substantially parallel top and bottom edges, and a pair of substantially parallel side edges extending substantially perpendicular to said top and bottom edges of said body shield;

a generally trapezoidal planar head shield upwardly extending from said top edge of said body shield, said body and head shields lying in a common plane with one another;

said body and head shields comprising substantially coextensive front and back protective layers, a dividing layer interposed between said front and back layers, and an outer layer substantially enclosing said front and back layers and said dividing layer therein;

said front protective layer being positioned towards said front face of said body shield, said back protective layer being positioned towards said back face of said body shield;

said front protective layer comprising a metal material;

said back protective layer comprising an aramid fiber woven material;

said dividing layer and said outer layer each comprising a fabric material;

said body shield being adapted for positioning adjacently behind a backrest and headrest of a seat of a vehicle, said head shield being adapted for positioning above and behind the headrest of the seat of the vehicle;

said body shield being adapted for attachment to the headrest of the seat;

a plurality of elongate flexible vertical straps being coupled to said front face of said body shield towards said top edge of said body shield;

each of said vertical straps being adapted for looping vertically around the headrest of the seat to attach said body shield to the headrest of the seat;

each of said vertical straps having a free end;

a plurality of fastening loops being coupled to said front face of said body shield, each of said fastening loops being associated with a corresponding vertical strap;

said free ends of said vertical straps being extended through the respective associated fastening loops, each of said vertical straps having a hook and loop fastener thereon detachably coupling the free end of the respective vertical strap to an adjacent portion of the respective vertical strap; and an elongate flexible horizontal strap being coupled to said body shield, said horizontal strap being adapted for looping horizontally around the headrest of the seat over the vertical straps to attach said body shield to the headrest of the seat.

2. A ballistic shield for attachment to a backrest of a seat of a vehicle, said ballistic shield comprising:

a body shield having front and back faces;

said body shield being adapted for positioning adjacently behind a backrest and headrest of a seat of a vehicle;

said body shield being adapted for attachment to the headrest of the seat;

a plurality of elongate flexible vertical straps being coupled to said front face of said body shield towards said top edge of said body shield; and each of said vertical straps being adapted for looping vertically around the headrest of the seat to attach said body shield to the headrest of the seat.

3. The ballistic shield of claim 2, further comprising an elongate flexible horizontal strap being coupled to said body shield, said horizontal strap being adapted for looping horizontally around the headrest of the seat over the vertical straps to attach said body shield to the headrest of the seat.

4. The ballistic shield of claim 2, wherein each of said vertical straps having a free end, wherein a plurality of fastening loops are coupled to said front face of said body shield, wherein each of said fastening loops is associated with a corresponding vertical strap, wherein said free ends of said vertical straps are extended through the respective associated fastening loops.

5. The ballistic shield of claim 4, wherein each of said vertical straps has a hook and loop fastener thereon detachably coupling the free end of the respective vertical strap to an adjacent portion of the respective vertical strap.

6. The ballistic shield of claim 2, further comprising a planar head shield upwardly extending from said body shield, said head shield being adapted for positioning above and behind the headrest of the seat of the vehicle.

7. The ballistic shield of claim 6, wherein said body and head shields lie in a common plane with one another.

8. The ballistic shield of claim 6, wherein said body and head shields comprise front and back protective layers, and an outer layer substantially enclosing said front and back layers therein.

9. The ballistic shield of claim 8, wherein said front protective layer comprises a metal material, wherein said back protective layer comprises an aramid fiber woven material, and wherein said outer layer comprises a fabric material.

10. The ballistic shield of claim 8, wherein said body and head shields further comprise dividing layer interposed between said front and back layers.

11. The ballistic shield of claim 10, wherein said dividing layer comprises a fabric material.

* * * * *